United States Patent [19]

Rader

[11] Patent Number: 4,576,119
[45] Date of Patent: Mar. 18, 1986

[54] DRINKER SHROUD

[76] Inventor: Helmut Rader, 1182 Dolly Madison Blvd., McLean, Va. 22101

[21] Appl. No.: 515,268

[22] Filed: Jul. 19, 1983

[51] Int. Cl.³ .............................................. A01K 7/00
[52] U.S. Cl. ..................................................... 119/81
[58] Field of Search ........................ 119/81, 72, 78, 79, 119/80

[56] References Cited

U.S. PATENT DOCUMENTS

| | | | |
|---|---|---|---|
| 2,567,177 | 9/1951 | Beckley | 119/81 |
| 2,669,220 | 2/1954 | Goff | 119/81 |
| 2,790,417 | 4/1957 | Brembeck | 119/72 |
| 3,675,627 | 7/1972 | Myers | 119/81 |
| 3,685,495 | 8/1972 | Kantor | 119/81 |
| 4,196,699 | 4/1980 | Leeming | 119/81 |
| 4,323,036 | 4/1982 | Salerno | 119/81 |

FOREIGN PATENT DOCUMENTS 1059704 6/1959 Fed. Rep. of Germany.

Primary Examiner—Jay N. Eskovitz

[57] ABSTRACT

A shroud is provided for a poultry drinker to protect the poultry drinker bell from contamination, and to enhance the versatility and functionality of the drinker. The shroud comprises a plastic bell adapted to be releasably mounted so that it is stationary with respect to the valve body and/or hanger for the drinker, and is exterior of the drinker bell. The shroud includes a generally concentric opening formed at the top, and has a substantially flat bottom. Releasable attachment of the shroud to the drinker is provided by a generally radially extending flange at the top opening, and/or by a collar substantially defining and concentric with the top opening. The shroud is particularly useful with poultry drinkers that can both stand and be suspended.

19 Claims, 8 Drawing Figures

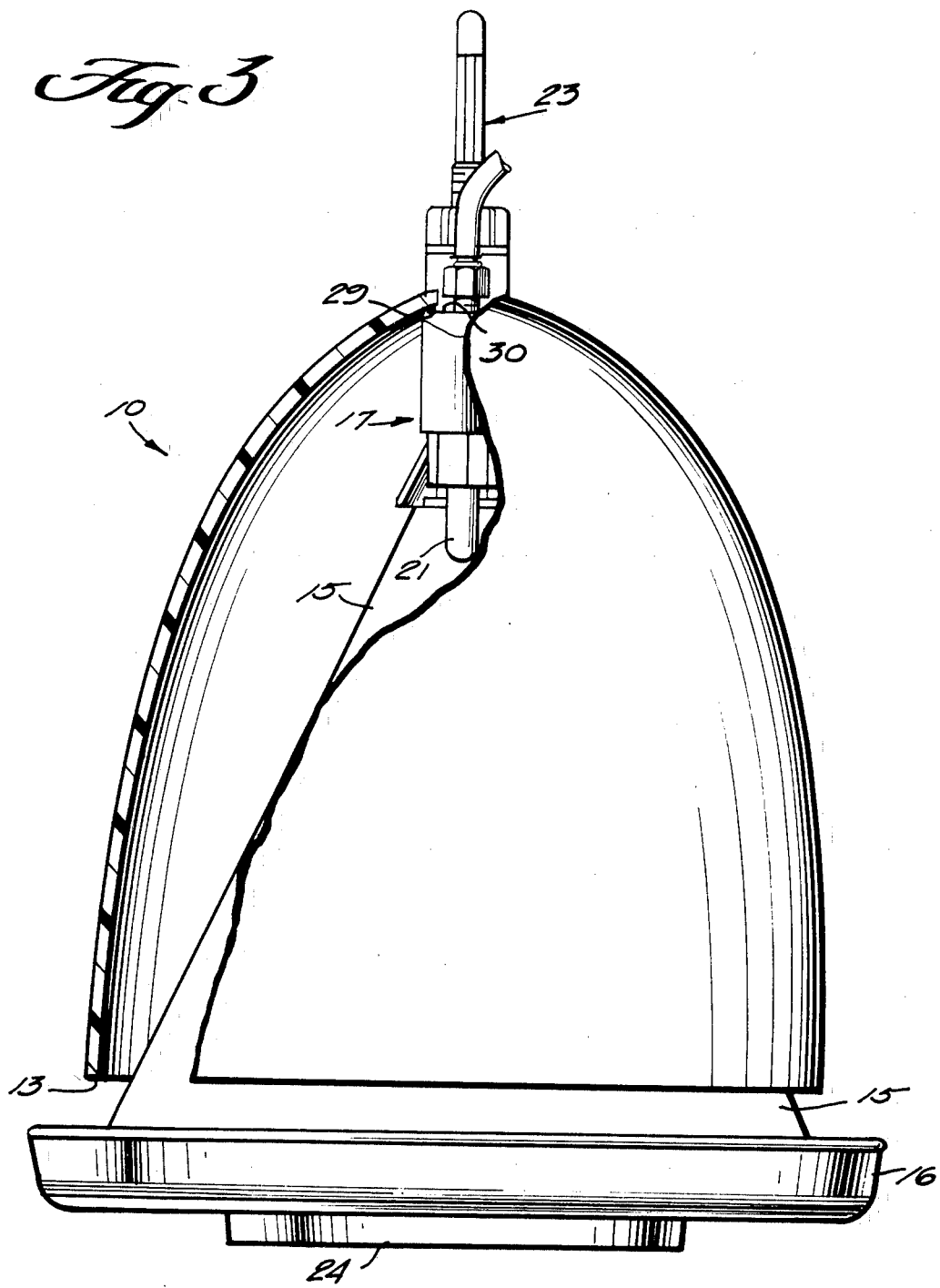

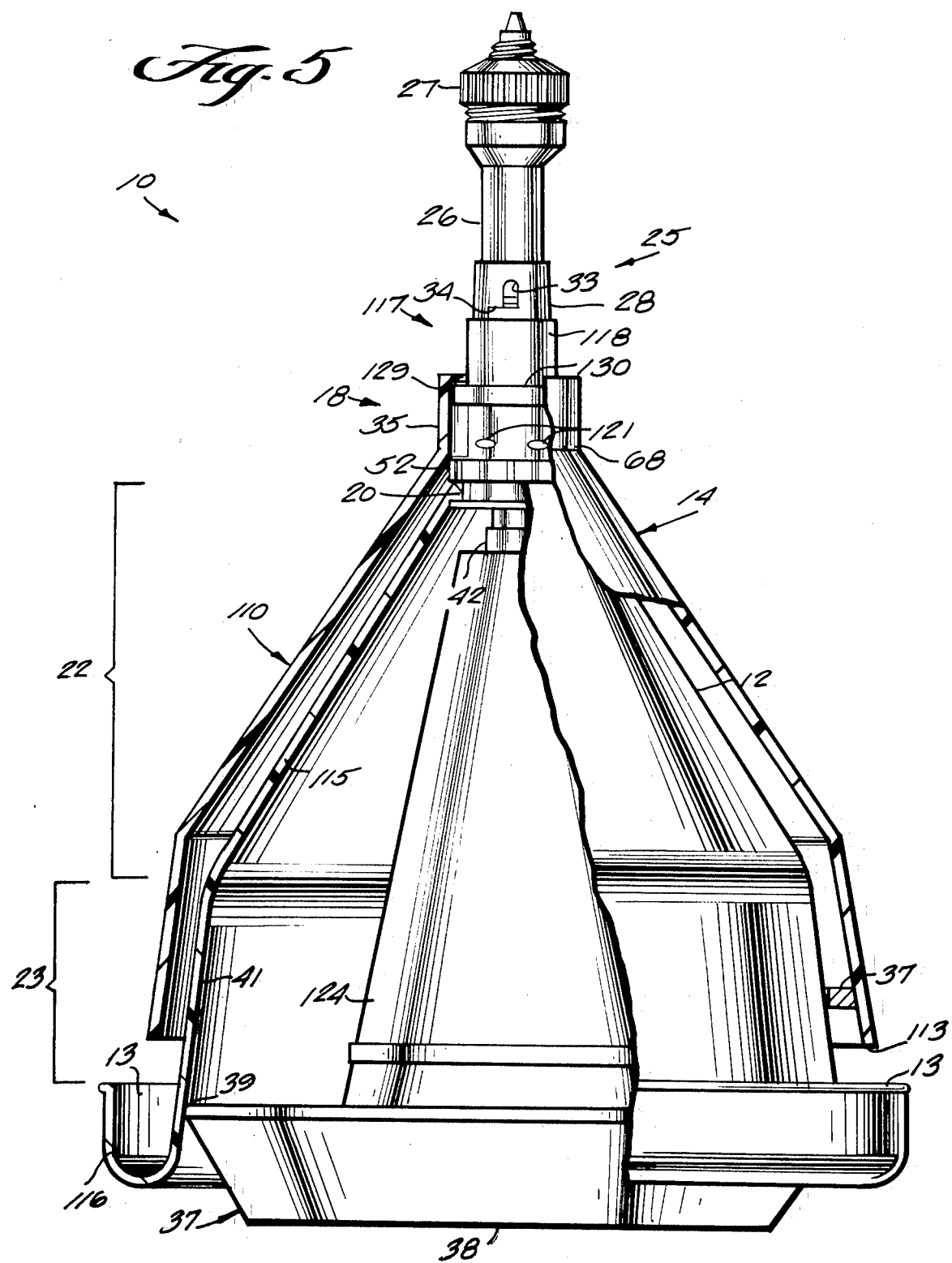

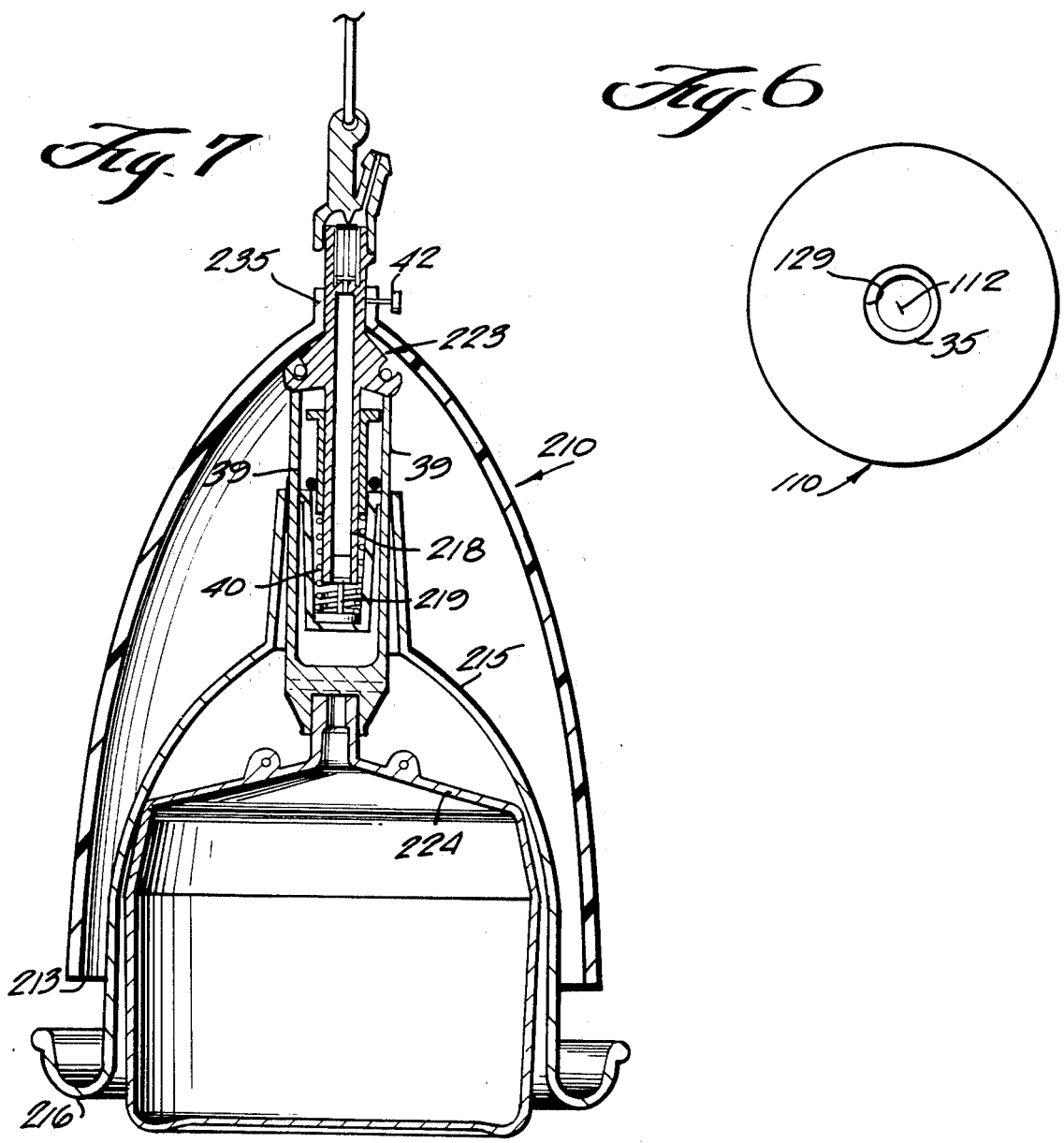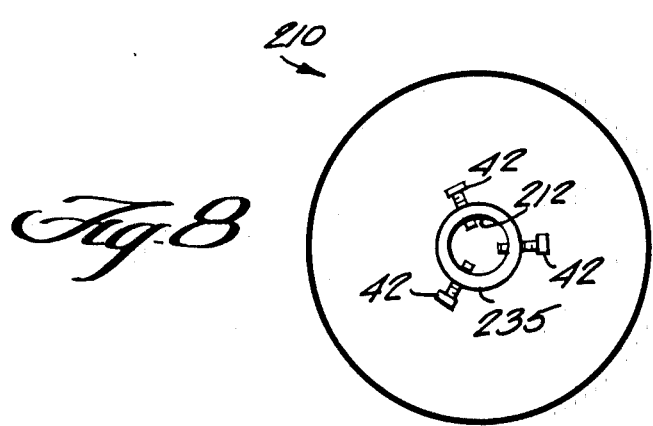

DRINKER SHROUD

BACKGROUND AND SUMMARY OF THE INVENTION

The invention relates to a poultry drinker, a shroud for use with the poultry drinker, and a method of protecting the poultry drinker—and enhancing its versatility—using a shroud.

In conventional poultry drinkers, such as shown in U.S. Pat. Nos. 3,685,495, 4,196,699, and 4,323,036 (the disclosures of which are hereby incorporated by reference herein) typically a bell having a watering trough at the bottom thereof comprises a main component of the drinker. The drinker also includes a valve means having a valve body and a valve member for allowing or preventing flow of liquid through the valve body to the trough. The bell and valve means are operatively interconnected so that the bell is movable (vertically reciprocal) with respect to the valve body, the relative movement taking place depending upon the amount of water in the trough, and the movement effecting actuation or deactuation of the valve member to allow the flow of water through the valve body and over the exterior periphery of the bell into the trough.

While poultry drinkers of the type described above have been very commercially successful, there are a number of drawbacks associated therewith. One major drawback is the contamination of the water flowing into the trough that can result from the contamination of the bell external periphery as a result of normal exposure to environmental conditions in a poultry house or the like. Typically the external periphery of the bell becomes coated with dust, grime, and other contaminants, and then when the water periodically flows over the bell external periphery it picks up the contaminants and delivers them to the trough, for ultimate consumption by the poultry. This problem is typically dealt with—when addressed at all—in poultry houses by having labor periodically wipe off the bell external periphery. This procedure can be relatively costly, and in addition can result in damage to the drinker if the laborer is not cautious in effecting the wiping.

Another drawback associated with conventional poultry drinkers, as described above, is that the shape of the bell is often less than optimum from the functional standpoint in order to achieve a desired aesthetic impression. Bells are often constructed in such a manner so that they are not properly stackable, or are not made with the absolute minimal amount of material given the trough dimensions desired, in favor of aesthetics.

Still another drawback associated with prior art poultry drinkers is excessive squirting and splashing of the water as it is delivered toward the trough. If the water pressure in the water source with which the drinker is associated is too high, this can often cause the water to be emitted from the valve means so that it sprays all over the poultry house or the like, rather than flowing neatly down the bell into the trough. This has been dealt with in the commercial art by providing particularly directed passageways, or accessory splash rings or the like, with variable results.

According to the present invention a poultry drinker is provided which does not have any of the drawbacks mentioned above. According to another aspect of the invention a shroud is provided for use with a poultry drinker in order to eliminate the above drawbacks, and according to yet another aspect a method of enhancing the desired functionality of a poultry drinker—utilizing a shroud—is provided.

The basic feature according to the present invention comprises a shroud adapted to be disposed substantially concentric with the drinker bell, and disposed externally thereof. The shroud is mounted with respect to the bell so that it is spaced from the bell over substantially the entire area of the bell, and protects the bell from contamination. Thus the water flowing over the bell surface will always have a substantially clean pathway, and since the external surface of the shroud will never come in contact with the water it need never be cleaned. Also, the provision of the shroud allows the bell to be constructed in a manner so that it has optimum functionality. For instance the bell can be construced so that it utilizes the minimum amount of material given a particular trough diameter, and so that it has maximum stackability. Any desired aesthetic affect can be provided by the shroud.

The shroud also inherently provides a splash-preventing function. The shroud is typically disposed so that it completely covers (while not interferring with) the passageway providing water from the valve to flow over the external periphery of the bell. Thus if the water pressure is too high, instead of the water spraying all over the poultry house or the like, it impacts the internal periphery of the shroud and then properly flows down the external periphery of the bell, into the trough.

The shroud according to the present invention preferably comprises a plastic bell having an opening at the top thereof generally concentric with the bell opening, and having a substantially flat bottom. The shroud can be of a different colored plastic than the bell so as to provide varied aesthetic affects, and the bell can be made so that it is stackable in an ultra-low volume configuration for easy shipment. The shroud may be releasably supported on the drinker valve body, or a hanger for supporting the valve body, by a radially extending flange or the like, and a collar may also be provided defining the opening at the top of the shroud, with the flange, or removable fasteners, associated with the collar.

It is the primary object of the present invention to provide for the enhanced functionality of a poultry drinker or the like. This and other objects of the invention will become clear from an inspection of the detailed description of the invention, and from the appended claims.

BRIEF DESCRIPTION OF THE DRAWINGS

FIG. 3 is a side view, partly in cross-section and partly in elevation, of an exemplary poultry drinker according to the present invention utilizing the shroud of FIG. 1;

FIG. 5 is a side view, partly in crosssection and partly in elevation, of another exemplary poultry drinker according to the present invention;

FIG. 6 is a top plan view of the shroud for the drinker of FIG. 5;

FIG. 7 is a side cross-sectional view of another exemplary drinker according to the present invention; and FIG. 8 is a top plan view of the shroud utilized with the drinker of FIG. 7.

DETAILED DESCRIPTION OF THE DRAWINGS

Figure 1:
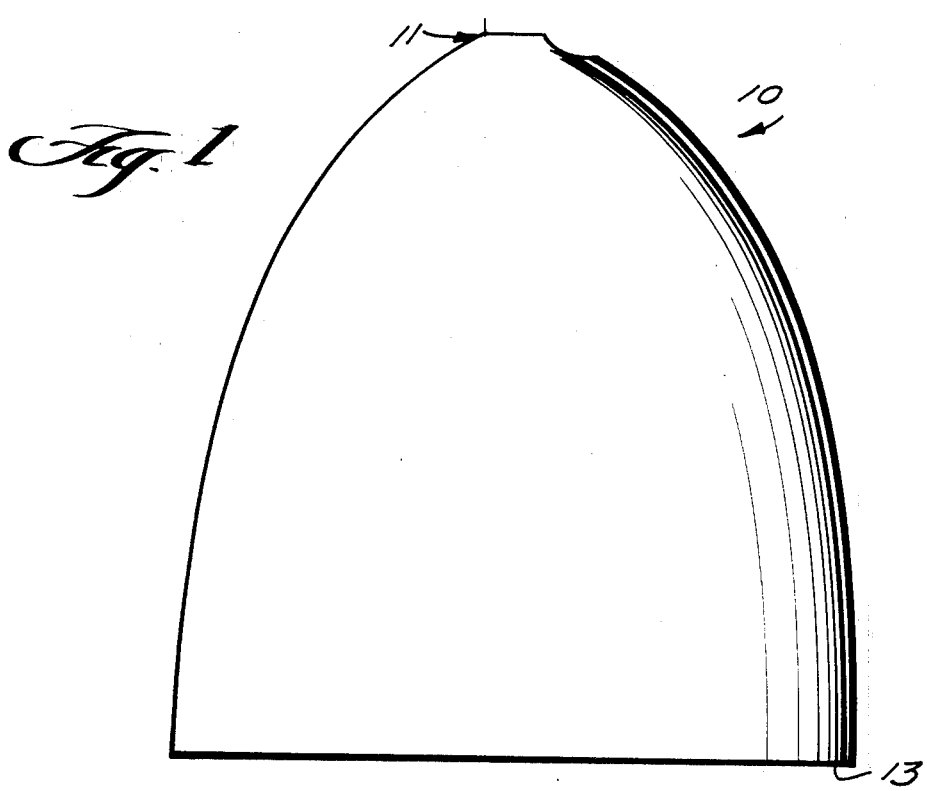
FIG. 1 is a side elevational view of an exemplary shroud according to the present invention.
Figure 2:
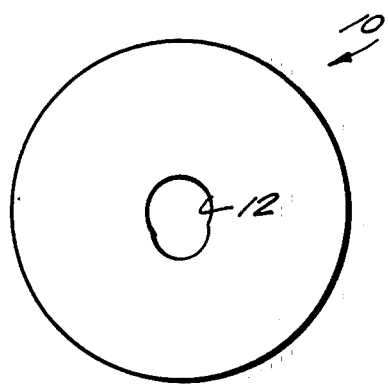
FIG. 2 is a top plan view of the shroud of FIG. 1.

A first embodiment of an exemplary shroud according to the present invention is shown generally by reference numeral 10 in FIGS. 1 through 4. The shroud comprises a bell that preferably is injection molded from thermoplastic material, and comprises a top portion 11 with a generally concentric opening 12 defined therein, and a substantially flat bottom 13. While the bell 10 is illustrated as having a generally rounded external configuration, it may have a wide variety of other shapes. For instance the bell may have an entirely conical configuration, may comprise a plurality of right circular cone frustrums having different angles of inclination, may have an irregular shape, or a wide variety of other configurations.

Figure 4:
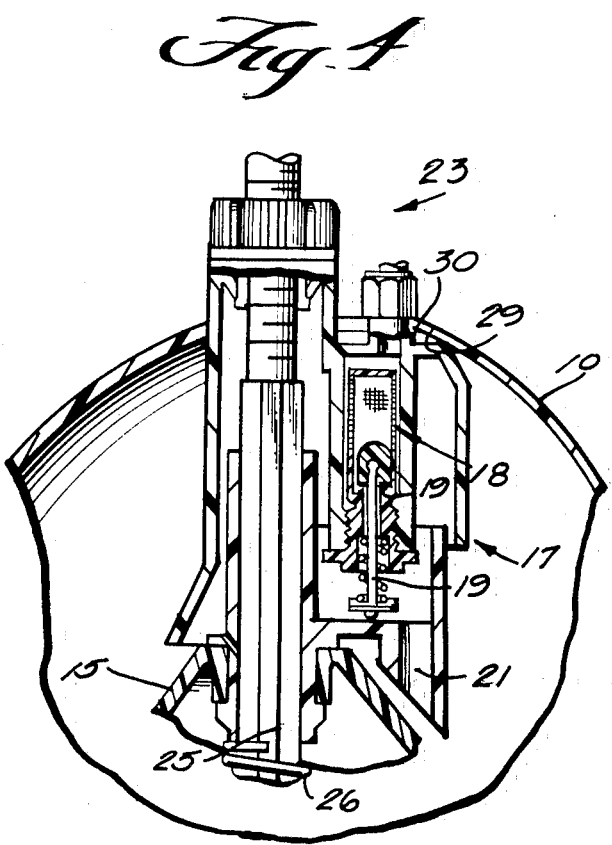
FIG. 4 is a detail side cross-sectional view of the shroud, valve means, and interconnection between the shroud and valve means, for the drinker of FIG. 3.

In FIGS. 3 and 4, the bell 10 is shown in use as part of a poultry drinker. The particular poultry drinker illustrated in FIGS. 3 and 4 is a conventional drinker as shown in U.S. Pat No. 4,323,036 (the disclosure of which is hereby incorporated by reference herein). The drinker includes a bell 15 having an annular trough 16 at the bottom thereof, and valve means 17 including a valve body 18 (see FIG. 4) and a valve member 19 for allowing or preventing flow of liquid through the valve body 18 to the trough 16. Means are provided for operatively interconnecting the bell and the valve means so that the bell is movable (i.e. vertically reciprocal) with respect to the valve means to actuate or deactuate the valve member. When the water in the trough 16 drops below a predetermined level the bell 15 rises and actuates the valve member 19 so that water flows through the valve body 18, through passageway 21, and onto the external periphery of the bell 15, flowing downwardly in contact with the external periphery of the bell 15 to the trough 16.

In the embodiment illustrated in FIGS. 3 and 4, the drinker includes hanger means 23 operatively connected to the valve body 18, and stationary with respect thereto, the hanger means 23 providing for support of the valve body 18—either by suspension or standing on the ground—at any predetermined position. A stand or ballast member 24 is disposed interiorly of the bell 15 and is operatively connected to the hanger 23 by central rod 25 comprising part of the hanger 23. A spring 26 is operatively disposed between the bell 15 and the stand or ballast 24 for operatively interconnecting the bell 15 and hanger 23 to allow the vertical movement of the bell 15 in response to weight of the water in the trough 16. The stand or ballast 24 is attached to the hanger means 23, through central rod 25, independently of the spring 26 so that the weight of the standard ballast 24 minimizes swinging of the bell 15 (when suspended by the hanger means 23) but does not affect sensitivity of the spring 26 for operating the valve means 17. A portion of the stand or ballast member 24 (as seen in FIG. 3) extends downwardly from the bottom of the trough 16 so that the drinker may be utilized either as a suspension or a standing type drinker.

Releasable mounting of the shroud 10 with respect to the valve body 18 and hanger means 23 is provided by a simple generally radially extending flange portion 29 of the shroud bell 10 adjacent the opening 12, which engages substantially horizontally extending portions 30 of the valve body 18/hanger means 23. This is only one way that attachment of the shroud 10 to the valve body 18/hanger means 23 may be effected. If desired a permanent connection can be effected (e.g. by providing an ultrasonic weld between components), or various other gripping or fastening means may be associated therewith.

It will be seen from an inspection of FIGS. 3 and 4 that the shroud 10 protects the external periphery of the bell 15 so that it will not be contaminated, and so that water flowing down it to the trough 16 will not pick up contaminants. Also, it will be seen that the bell 15 in this embodiment is illustrated as having a substantially completely conical shape, rather than being formed by two right circular cone frustrums as illustrated in said U.S. Pat. No. 4,323,036. The configuration of the bell 15 is such that the bell is readily stackable in an ultra-low volume configuration, and so that it uses a minimum amount of material for a given diameter of the trough 16. Any aesthetic functions are provided by the shroud 10 itself, which may have the shape illustrated in FIGS. 1 through 4, or any other shape (e.g. see the FIG. 5 embodiment). Also, if water issuing through tube 21 issues too quickly and splashes violently against the bell 15, the water will not spray all over the poultry house or the like since it will impact upon the interior surface of the shroud 10, and then be caused to flow down it and/or the external periphery of the bell 15 to the trough 16, as desired.

A second embodiment of an exemplary drinker according to the present invention is shown in FIGS. 5 and 6. In the FIGS. 5 and 6 embodiment components having comparable functions to the components in the FIGS. 3 and 4 embodiment are illustrated by the same reference numeral only preceded by a "1".

The basic drinker illustrated in FIG. 5 is that shown in co-pending application Ser. No. 390,774 filed June 21, 1982, and may include particular valve and actuating components such as shown in U.S. Pat. No. 4,196,699 (the disclosure of which is hereby incorporated by reference herein). This drinker also is capable of being suspended or standing.

In this embodiment the shroud 110 is illustrated as having two right circular cone frustrums defining the basic configuration thereof. Also a collar 35 is provided defining the opening 112 (see FIG. 6), and the support flange 129 extends radially inwardly from the collar 35 and engages the generally horizontal support surface 130 of the valve body 118 for releasably supporting the shroud 110 in place. Additionally in this embodiment the shroud 110 includes a plurality of spacers 37 (only one of which is shown in FIG. 5) disposed around the internal periphery thereof for operatively engaging the external periphery of the bell 115 and maintaining a desired spacing and alignment between the shroud 110 and the bell 115. The spacers 37 may be integral with the shroud 110, or may be attached thereto by fasteners or the like, and may have any desired arcuate extent, thickness, or the like, depending upon the particular shape of the bell 115 with which they are utilization.

In this embodiment, as in the FIGS. 1 through 4 embodiment, the shroud 110 prevents contamination of the external periphery of the bell 115, provides a varied (if desired) aesthetic effect, and directs water that may squirt out of the opening 121 so that it flows downwardly on the external periphery of the bell 115 to the trough 116. No splash ring is necessary.

A third embodiment of a drinker according to the present invention is illustrated in FIGS. 7 and 8. In this embodiment structures having like functionality with components of the FIGS. 1 through 4 embodiment are illustrated by the same reference numeral only preceded by "2". In this embodiment, the basic drinker is that shown in U.S. Pat. No. 3,685,495, the disclosure of which is hereby incorporated by reference herein.

In this embodiment, the rod 39 connects the stand or ballast member 224 to the hanger means 223. A spring 40 provides a resilient mount between the bell 215 and the hanger 223 to allow for the vertical reciprocation of the bell 215 responsive to the weight of water in the trough 216, and a stand or ballast member 225 is mounted independent of the spring 40.

Also in the FIGS. 7 and 8 embodiment, a collar 235 defining the top opening 212 in the shroud bell 210 comprises part of the means for releasably attaching the shroud 210 to the hanger 223. While a radially extending flange could be used, as in the other embodiments, in this embodiment a plurality of screw threaded fasteners 42 pass through screw threaded openings in the collar 235 and frictionally engage portions of the hanger 223 to hold the trough 210 positively in place. In this embodiment, as in the others, the shroud 210 provides for functional enhancement of the drinker by preventing contamination of the bell 215 external surface, directing any water splashing from water-emitting openings (not shown) onto the external periphery of the bell 215 to flow down it to the trough 216, and provides the aesthetics for the drinker allowing the bell 215, and stand or ballast member 224, to be constructed in any optimum manner.

It will thus be seen that according to the present invention a poultry drinker, shroud, and method of enhancing the functionality of a poultry drinker, have been provided which eliminate numerous drawbacks associated with conventional poultry drinkers.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, assemblies, and procedures.

What is claimed is:

1. A poultry drinker comprising:
   a bell including a watering trough formed at the bottom thereof and including means defining a substantially central opering at the top thereof;
   valve means including a valve body having a valve member for allowing or preventing flow of liquid through the valve body to the trough;
   means for operatively interconnecting said bell and valve means so that said bell is movable with respect to said valve body to actuate or deactuate said valve member depending upon the amount of water in said trough, water from said valve means flowing to said trough; and
   a shroud generally concentric with said bell and disposed exteriorly of the exterior periphery of said bell, said shroud substantially coextensive with said bell over the entire length thereof except for said trough and for preventing contamination of said bell exterior surface over substantially the entire extent thereof, and mounted with respect to said bell and valve means so that operation of said valve means by said movement of said bell with respect to said valve body is substantially unimpeded.

2. A drinker as recited in claim 1 wherein said bell comprises a first bell, and wherein said shroud comprises a second bell.

3. A drinker as recited in claim 2 wherein said second bell is constructed so that it is stackable with like bells in an ultra-low volume configuration.

4. A drinker as recited in claim 2 wherein said shroud is of thermoplastic material.

5. A drinker as recited in claim 1 further comprising hanger means for supporting said valve body in a predetermined vertical position with respect to the ground; and wherein said means for operatively interconnecting said bell and said valve means comprises a resilient mounting operatively mounting said bell to said hanger means.

6. A drinker as recited in claim 5 further comprising a stand or ballast member disposed interiorly of said bell; and means for mounting said stand or ballast member to said hanger means independently of said resilient mounting of said bell to said hanger means so that when said drinker is suspended off the ground by said hanger means, said stand or ballast member minimizes swinging of the hanger means and bell but does not affect the sensitivity of said resilient mounting means of said bell for operating said valve means.

7. A drinker as recited in claim 6 wherein said stand or ballast member includes a bottom portion thereof which extends downwardly past the trough at the bottom of the bell so that said stand or ballast member may operatively support the drinker on the ground.

8. A drinker as recited in claim 1 further comprising a stand or ballast member, said stand or ballast member disposed interiorly of said bell and operatively connected to the valve means so that if said drinker is suspended said stand or ballast member acts as a ballast to minimize swinging of said bell, and additionally said stand or ballast member will operatively support said drinker on the ground by itself, said stand or ballast member extending downwardly from said bell disposed interiorly thereof.

9. A drinker as recited in claim 8 wherein said shroud is operatively readily releasably mounted to said valve body so that it is stationary with respect to said valve body during use, but is readily removable therefrom.

10. A drinker as recited in claim 9 wherein said shroud is mounted to said valve body by a generally horizontally extending flange portion which abuts a generally horizontally extending portion of said valve body.

11. A drinker as recited in claim 1 wherein said shroud is operatively readily releasably mounted to said valve body so that it is stationary with respect to said valve body during use, but is readily removable therefrom.

12. A drinker as recited in claim 1 wherein said shroud is mounted to said valve body by a generally horizontally extending flange portion which abuts a generally horizontally extending portion of said valve body.

13. A drinker as recited in claim 6 wherein said shroud is operatively connected to said hanger means so that said shroud is stationary with respect to said hanger means during use, but so that said shroud is readily removable therefrom.

14. A drinker as recited in claim 13 wherein said shroud includes a collar operatively disposed at the top of said shroud and defining an opening in the top of said shroud generally concentric with said bell opening; and wherein said shroud is mounted to said hanger by operative interengagement between said collar and said hanger.

15. A drinker as recited in claim 1 further comprising a hanger for suspending said valve body; and wherein said shroud includes a collar operatively disposed at the top of said shroud and defining an opening in the top of said shroud generally concetric with said bell opening; and wherein said shroud is mounted to said hanger by operative interengagement between said collar and said hanger.

16. A drinker as recited in claim 4 wherein said bell is of thermoplastic material, and wherein said bell and shroud are of different colors.

17. A drinker as recited in claim 1 further comprising:
a plurality of spacers disposed around the internal periphery of said shroud and operatively engaging the external periphery of said bell for maintaining a desired spacing and alignment between said shroud and said bell.

18. A drinker as recited in claim 8 further comprising:
a plurality of spacers disposed around the internal periphery of said shroud and operatively engaging the external periphery of said bell for maintaining a desired spacing and alignment between said shroud and said bell.

19. A drinker as recited in claim 15 further comprising:
a plurality of spacers disposed around the internal periphery of said shroud and operatively engaging the external periphery of said bell for maintaining a desired spacing and alignment between said shroud and said bell.

* * * * *